United States Patent
Tegreene et al.

(10) Patent No.: US 10,374,669 B2
(45) Date of Patent: Aug. 6, 2019

(54) TUNABLE MEDIUM LINEAR CODER

(71) Applicant: Elwha LLC, Bellevue, WA (US)

(72) Inventors: Clarence T. Tegreene, Mercer Island, WA (US); Yaroslav A. Urzhumov, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 121 days.

(21) Appl. No.: 15/253,606

(22) Filed: Aug. 31, 2016

(65) Prior Publication Data
US 2018/0062265 A1    Mar. 1, 2018

(51) Int. Cl.
*H01Q 3/46* (2006.01)
*H01Q 15/02* (2006.01)
*H04B 7/0456* (2017.01)
*H01Q 15/00* (2006.01)
*H01Q 19/06* (2006.01)
*H04B 7/0413* (2017.01)

(52) U.S. Cl.
CPC ............ *H04B 7/0456* (2013.01); *H01Q 3/46* (2013.01); *H01Q 15/0066* (2013.01); *H01Q 15/02* (2013.01); *H01Q 19/06* (2013.01); *H04B 7/0413* (2013.01)

(58) Field of Classification Search
CPC .... H01Q 9/0442; H01Q 1/42; H01Q 15/0086; H01Q 3/46; H01Q 15/0066; H01Q 15/02; H01Q 19/06
See application file for complete search history.

(56) References Cited

U.S. PATENT DOCUMENTS

| | | |
|---|---|---|
| 5,005,418 A | 4/1991 | Anderson |
| 5,441,532 A | 8/1995 | Fenn |
| 5,920,285 A | 7/1999 | Benjamin |
| 5,930,314 A | 7/1999 | Lanza |
| 6,533,733 B1 | 3/2003 | Ericson et al. |
| 6,876,337 B2 | 4/2005 | Larry |
| 6,879,693 B2 | 4/2005 | Miller et al. |
| 7,924,226 B2 | 4/2011 | Soler Castany et al. |
| 7,928,900 B2 | 4/2011 | Fuller et al. |
| 8,504,138 B1 | 8/2013 | Pivonka et al. |
| 8,847,840 B1 | 9/2014 | Diaz |
| 8,848,295 B2 | 9/2014 | Smith et al. |

(Continued)

OTHER PUBLICATIONS

N. Kundtz & D. Smith, "Extreme-Angle Broadband Metamaterial Len," Nature Mat. 9, p. 129 (2010).

(Continued)

*Primary Examiner* — Hoang V Nguyen

(57) ABSTRACT

Disclosed are antenna systems and related methods. An antenna system includes a plurality of near-end electromagnetic (EM) radiating elements, a tunable medium, and control circuitry. The tunable medium is positioned relative to the plurality of near-end EM radiating elements and a plurality of far-end EM radiating elements to scatter EM radiation transmitted between the plurality of near-end EM radiating elements and the plurality of far-end EM radiating elements. The control circuitry includes a controller operably coupled to the tunable medium. A method includes modifying EM properties of the tunable medium to modify the EM radiation transmitted between the plurality of near-end EM radiating elements and the plurality of far-end EM radiating elements.

39 Claims, 5 Drawing Sheets

(56) References Cited

U.S. PATENT DOCUMENTS

| | | |
|---|---|---|
| 9,252,492 B2 | 2/2016 | Alrabadi et al. |
| 9,917,376 B2 | 3/2018 | Belmkaddem et al. |
| 2002/0130804 A1 | 9/2002 | McMakin et al. |
| 2003/0011515 A1 | 1/2003 | Warble et al. |
| 2004/0162034 A1* | 8/2004 | Parker .................. H01Q 3/44 455/82 |
| 2004/0201526 A1 | 10/2004 | Knowles et al. |
| 2007/0288066 A1 | 12/2007 | Christman et al. |
| 2008/0015421 A1 | 1/2008 | Penner |
| 2008/0054899 A1 | 3/2008 | Aksoy et al. |
| 2009/0284431 A1 | 11/2009 | Meharry et al. |
| 2010/0022861 A1 | 1/2010 | Cinbis et al. |
| 2010/0136926 A1* | 6/2010 | Lackey ................. H04B 1/126 455/78 |
| 2010/0262160 A1 | 10/2010 | Boyden et al. |
| 2010/0262239 A1 | 10/2010 | Boyden et al. |
| 2010/0301971 A1* | 12/2010 | Yonak ................. H01P 1/20381 333/219.1 |
| 2010/0324378 A1 | 12/2010 | Tran et al. |
| 2011/0086598 A1 | 4/2011 | Ali et al. |
| 2011/0087306 A1 | 4/2011 | Goossen |
| 2011/0260920 A1* | 10/2011 | Dybdal ................. G01S 7/2813 342/379 |
| 2013/0154558 A1 | 6/2013 | Lee et al. |
| 2013/0335256 A1 | 12/2013 | Smith et al. |
| 2014/0039277 A1 | 2/2014 | Abraham |
| 2014/0056378 A1* | 2/2014 | Harel ................... H04B 7/0408 375/267 |
| 2014/0128032 A1 | 5/2014 | Muthukumar |
| 2014/0306784 A1 | 10/2014 | Broyde et al. |
| 2014/0334565 A1 | 11/2014 | Tzanidis et al. |
| 2014/0340732 A1 | 11/2014 | Zhang et al. |
| 2015/0130285 A1 | 5/2015 | Leabman et al. |
| 2015/0171516 A1 | 6/2015 | Chen et al. |
| 2016/0074196 A1 | 3/2016 | Forsell |
| 2016/0344240 A1 | 11/2016 | Yeh et al. |
| 2017/0063344 A1 | 3/2017 | Broyde et al. |
| 2017/0063439 A1 | 3/2017 | Frank |
| 2017/0163327 A1 | 6/2017 | Yang et al. |
| 2017/0356980 A1 | 12/2017 | Islam et al. |

OTHER PUBLICATIONS

D. Smith, Y. Urzumov et al., "Enhancing imaging systems using transformation optics" Optics Express 18, 21238 (2010).

Zhang et al.; "Optimal Load Analysis for a Two-Receiver Wireless Power Transfer System"; Wireless Power Transfer Conference (WPTC), 2014 IEEE 2014; pp. 84-87.

PCT International Search Report; International App. No. PCT/US2018/053759; dated Jan. 31, 2019; pp. 1-3.

* cited by examiner

TUNABLE MEDIUM LINEAR CODER

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

None

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

DETAILED DESCRIPTION

Figure 1:
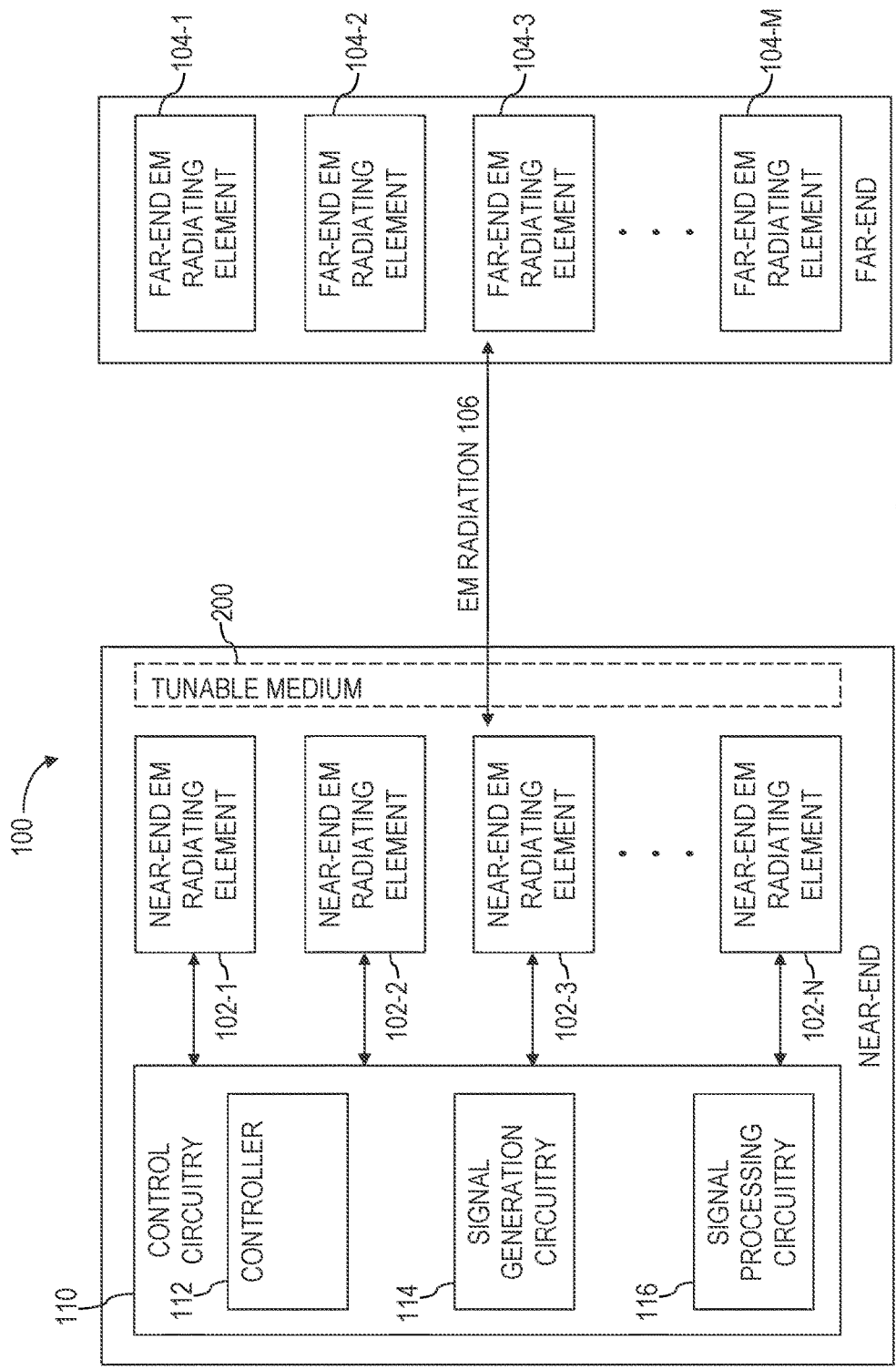
FIG. 1 is a simplified block diagram of an antenna system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

Disclosed in some embodiments herein is an antenna system including a plurality of near-end electromagnetic (EM) radiating elements, a tunable medium, and control circuitry. The tunable medium is positioned relative to the plurality of near-end EM radiating elements and a plurality of far-end EM radiating elements to scatter EM radiation transmitted between the plurality of near-end EM radiating elements and the plurality of far-end EM radiating elements. The control circuitry includes a controller operably coupled to the tunable medium. The controller is programmed to modify EM properties of the tunable medium to modify the EM radiation transmitted between the plurality of near-end EM radiating elements and the plurality of far-end EM radiating elements.

Disclosed in some embodiments herein is a method of operating an antenna system. The method includes operating a plurality of near-end electromagnetic (EM) radiating elements, and scattering EM radiation transmitted between the plurality of near-end EM radiating elements and a plurality of far-end EM radiating elements with a tunable medium. The method also includes modifying EM properties of the tunable medium to modify the EM radiation transmitted between the plurality of near-end EM radiating elements and the plurality of far-end EM radiating elements.

Embodiments of the disclosure include antenna systems and related methods for tunable medium linear coders. Although the disclosure is generally described in terms of wireless communications (e.g., MIMO systems), the disclosure is not so limited. For example, embodiments of the disclosure also contemplate RADAR systems, wireless power systems, and any other systems where tunable medium linear coders would be helpful or desirable.

As used herein, the terms "coder," "precoder," and "decoder" refer to coding (i.e., precoding and/or decoding) for at least one of linear beamforming, linear spatial-diversity, and linear spatial multiplexing. This is in contrast to coders that perform time-domain analog modulation of signals for communication systems.

As used herein, the terms "EM radiating element" and "EM radiating elements" refer to structures that controllably emit EM radiation. For example, EM radiating elements may include dipole antennas, at least substantially omnidirectional antennas, patch antennas, aperture antennas, antenna arrays (e.g., multiple antennas functioning in an array to act together as a single EM radiating element, multiple antennas functioning in an array to act as multiple EM radiating elements, etc.), other EM radiating elements, or combinations thereof. As used herein, the term "at least substantially omnidirectional" refers to antennas having far-field directivity patterns that are approximately circular (e.g., in a horizontal plane) or spherical (e.g., for three-dimensional antenna patterns). By way of non-limiting example, a dipole antenna may be considered an omnidirectional antenna because a radiation pattern in a plane perpendicular to the dipole antenna is approximately circular. As will be appreciated by those of ordinary skill in the art, truly three-dimensional omnidirectional antennas are difficult or impossible to implement in practice at least because a feed point for enabling EM input to the antenna will disrupt a perfect spherical directivity pattern. The term "at least substantially omnidirectional" accounts for this practicality.

As used herein, the term "beamforming" refers to selectively (e.g., controllably) increasing signal power at one or more locations (e.g., locations of receiving antennas), decreasing signal power at one or more other locations (e.g., locations where there are not receiving antennas), or combinations thereof.

As used herein, the term "spatial-diversity" refers to sending multiple, redundant copies of information blocks of a given data stream between a given transmitting radiating element and a given receiving radiating element following different propagation paths. When these redundant copies of information blocks arrive with different degrees of corruption (e.g., due to frequency-selective fading, time dependence of a channel between the given transmitting radiating element and the given receiving radiating element, Doppler shifts, or combinations thereof), at the given receiving radiating element, extracting valid bits of data may reduce a bit error rate (BER). Higher data throughput (bandwidth) may result. Mathematically, spatial-diversity may be described as a time-dependent linear mapping of a scalar, complex-valued signal onto a vector of output values.

As used herein, the term "spatial multiplexing" refers to multiple propagation paths to transmit multiple data streams simultaneously between transmitting EM radiating elements and receiving EM radiating elements. These multiple data streams may be transmitted using a common frequency band. The multiple data streams become multiplexed (i.e., mixed together) by a channel between the transmitting EM radiating elements and the receiving EM radiating elements, even if not already multiplexed at the transmitting EM radiating elements before transmitting. Absent non-linear interactions, this multiplexing effect of the channel (and possibly of multiplexing at the transmitting EM radiating elements before transmitting), may be described as a linear operator acting on a vector of magnitudes of transmit signals at the transmitting EM radiating elements. In other words, receive signals received at the receiving EM radiating elements are equal to a matrix multiplication of the transmit signals by a channel matrix describing the channel. The multiplexed receive signals may be demultiplexed at the transmitting EM radiating elements (i.e., with a precoder), at the receiving EM radiating elements (i.e., with a decoder), or a combination thereof. Accurate demultiplexing requires knowledge of a channel matrix H. The channel matrix H is sometimes time dependent, frequency dependent, or a combination thereof.

Precoding and decoding may both be described mathematically as linear transformations of signal vectors (i.e., matrix multiplications of signal vectors). The choice of how demultiplexing is distributed between transmitting and receiving elements may be based, at least in part, on whether channel state information (CSI) (e.g., a channel matrix) is available at the transmitting and/or receiving elements. Also, the choice of how demultiplexing is distributed between transmitting and receiving elements may be based, at least in part, on whether or not one of the transmitting and receiving elements would benefit from reduced-complexity electronics (e.g., mobile devices such as cellular telephones with limited processing and battery power may benefit from reduced-complexity electronics). In extreme cases, all the demultiplexing may be performed at only one of the transmitting and the receiving side.

Demultiplexing is achieved when a precoder matrix A and a decoder matrix B are chosen such that the matrix product AHB is a diagonal matrix, or is numerically close to a diagonal matrix (in the latter case, the off-diagonal elements represent the strength of interference between the data streams). For example, AHB=cI, where I is the identity matrix and c is a constant, achieves demultiplexing. In the special case where the decoder is absent (B=I), the precoder matrix A may be chosen such that AH is a diagonal (or numerically close to a diagonal) matrix. Again, in some cases, A may be chosen simply as the matrix inverse (or pseudoinverse) of H.

As a non-limiting example, all demultiplexing may be done at the transmitting side. A well-known technique known as the Zero Forcing technique is an example case of all demultiplexing being done at the transmitting side. This scenario is particularly attractive to multi-user multiple input multiple output (MIMO) because it allows receive antennas (e.g., a very large number of mobile devices in a cellular data network) to operate without any knowledge of the channel state, and without any cooperation with each other (which may be difficult to achieve on time scales of radio frequency modulation).

Conventional linear coders (e.g., precoders, decoders) implement matrix multiplication using the literal definition of matrix multiplication. From a practical matter, this involves splitting signals and applying digitally-controlled amplitude and phase modulations to each path, then summing the signals from the different paths. For a MIMO transmitter with D data streams and N≥D output antennas (e.g., N=D), a total of N×D (which is ≥$D^2$) attenuators, N×D phase shifters (where _x_ is the multiplication operator), and N signal-summing circuits would be required to implement such a conventional linear coder. As a result, cost for implementing these conventional linear coders increases quadratically as the number of data streams increases. Digital phase shifters tend to be particularly expensive to implement, and have generally been the limiting factor for deployment of phased array systems in communications and RADAR systems. Disclosed herein are tunable medium linear coders that may be used to replace these expensive conventional coders.

As used herein, the term "near-end" refers to equipment located at a particular location (i.e., a near-end location). As used herein, the term "far-end" refers to locations located remotely from the particular location. Accordingly, the terms "near-end" and "far-end" are relative terms depending on the location of the particular location. For example, a first plurality of electromagnetic radiating elements would be a plurality of near-end electromagnetic radiating elements if located at the particular location. Also, a second plurality of electromagnetic radiating elements would be a plurality of far-end radiating elements if located remotely from the particular location (and, by extension, remotely from the first plurality of electromagnetic radiating elements). Conversely, if the particular location were instead deemed to be at the same location as the second plurality of electromagnetic radiating elements, the first plurality of electromagnetic radiating elements would be a plurality of far-end electromagnetic radiating elements. Also, the second plurality of electromagnetic radiating elements would be a plurality of near-end electromagnetic radiating elements if the particular location were deemed to be at the same location as the second plurality of electromagnetic radiating elements.

Various features disclosed herein may be applied alone or in combination with others of the features disclosed herein. These features are too numerous to explicitly indicate herein each and every other one of the features that may be combined therewith. Therefore, any feature disclosed herein that is practicable, in the view of one of ordinary skill, to combine with any other one or more others of the features disclosed herein, is contemplated herein to be combined. A non-exhaustive list of some of these disclosed features that may be combined with others of the disclosed features follows.

For example, in some embodiments, disclosed is an antenna system including a plurality of near-end electromagnetic (EM) radiating elements, a tunable medium, and control circuitry. The a tunable medium positioned relative to the plurality of near-end EM radiating elements and a plurality of far-end EM radiating elements to scatter EM radiation transmitted between the plurality of near-end EM radiating elements and the plurality of far-end EM radiating elements. The control circuitry includes a controller operably coupled to the tunable medium and programmed to modify EM properties of the tunable medium to modify the EM radiation transmitted between the plurality of near-end EM radiating elements and the plurality of far-end EM radiating elements.

In some embodiments, disclosed is an antenna system including a controller, wherein the controller is configured to dynamically modify EM properties of a tunable medium to dynamically modify EM radiation transmitted between a plurality of near-end EM radiating elements and a plurality of far-end EM radiating elements during operation of the antenna system.

In some embodiments, disclosed is an antenna system including a controller, wherein the controller is configured to pre-select a state of a tunable medium and hold the tunable medium in the selected state during operation of the antenna system.

In some embodiments, disclosed is an antenna system including control circuitry, wherein the control circuitry includes signal generation circuitry operably coupled to a plurality of near-end EM radiating elements and configured to deliver EM signals including a plurality of different data streams to the plurality of near-end EM radiating elements for transmission to a plurality of far-end EM radiating elements.

In some embodiments, disclosed is an antenna system including control circuitry, wherein the control circuitry includes signal processing circuitry operably coupled to a plurality of near-end EM radiating elements and configured to receive EM signals including a plurality of different data streams from a plurality of far-end EM radiating elements through the plurality of near-end EM radiating elements.

In some embodiments, disclosed is an antenna system including a plurality of far-end EM radiating elements, wherein the plurality of far-end EM radiating elements is distributed between at least two physically separate devices.

In some embodiments, disclosed is an antenna system including a plurality of far-end EM radiating elements, wherein a number of a plurality of data streams is equal to a number of the plurality of far-end EM radiating elements, and each of the plurality of far-end EM radiating elements receives only one of the plurality of data streams.

In some embodiments, disclosed is an antenna system including a plurality of far-end EM radiating elements, wherein a number of a plurality of data streams is equal to a number of the plurality of far-end EM radiating elements, and each of the plurality of far-end EM radiating elements transmits only one of the plurality of data streams.

In some embodiments, disclosed is an antenna system including a plurality of far-end EM radiating elements, wherein a number of a plurality of data streams is less than a number of the plurality of far-end EM radiating elements.

In some embodiments, disclosed is an antenna system including a plurality of near-end EM radiating elements, wherein a number of the plurality of near-end EM radiating elements is equal to a number of a plurality of data streams.

In some embodiments, disclosed is an antenna system including a plurality of near-end EM radiating elements, wherein a number of the plurality of near-end EM radiating elements is greater than a number of a plurality of data streams.

In some embodiments, disclosed is an antenna system including a plurality of near-end EM radiating elements, wherein at least one of the plurality of near-end EM radiating elements includes a dipole antenna.

In some embodiments, disclosed is an antenna system including a plurality of near-end EM radiating elements, wherein at least one of the plurality of near-end EM radiating elements includes an at least substantially omnidirectional antenna.

In some embodiments, disclosed is an antenna system including an at least substantially omnidirectional antenna, wherein the at least substantially omnidirectional antenna includes a dipole antenna that is at least substantially omnidirectional in a plane perpendicular to the dipole antenna.

In some embodiments, disclosed is an antenna system including a plurality of near-end EM radiating elements, wherein at least one of the plurality of near-end EM radiating elements includes a patch antenna.

In some embodiments, disclosed is an antenna system including a plurality of near-end EM radiating elements, wherein at least one of the plurality of near-end EM radiating elements includes an aperture antenna.

In some embodiments, disclosed is an antenna system including a plurality of near-end EM radiating elements, wherein at least one of the plurality of near-end EM radiating elements includes an antenna array.

In some embodiments, disclosed is an antenna system including a tunable medium, wherein the tunable medium includes a tunable metamaterial including a plurality of tunable EM scattering elements.

In some embodiments, disclosed is an antenna system including a plurality of tunable EM scattering elements, wherein at least one of the plurality of tunable EM scattering elements includes a tunable-impedance two-port lumped circuit element.

In some embodiments, disclosed is an antenna system including a plurality of tunable EM scattering elements, wherein the plurality of tunable EM scattering elements includes a plurality of tunable capacitive elements.

In some embodiments, disclosed is an antenna system including a plurality of tunable capacitive elements, wherein the plurality of tunable capacitive elements includes at least one of diodes and transistors.

In some embodiments, disclosed is an antenna system including a plurality of tunable capacitive elements, wherein the plurality of tunable capacitive elements includes at least one variable dielectric constant material.

In some embodiments, disclosed is an antenna system including a plurality of tunable capacitive elements, wherein the plurality of tunable capacitive elements includes at least one liquid crystal element.

In some embodiments, disclosed is an antenna system including a plurality of tunable EM scattering elements, wherein the plurality of tunable EM scattering elements includes a plurality of variable resistive elements.

In some embodiments, disclosed is an antenna system including a plurality of variable resistive elements, wherein the plurality of variable resistive elements includes at least one of diodes and transistors.

In some embodiments, disclosed is an antenna system including a plurality of tunable EM scattering elements, wherein the plurality of tunable EM scattering elements includes a plurality of variable inductance elements.

In some embodiments, disclosed is an antenna system including a tunable medium, wherein the tunable medium is tunable with a number of degrees of freedom that is greater than or equal to a number of independent elements of a channel matrix of channels between a plurality of near-end EM radiating elements and a plurality of far-end EM radiating elements.

In some embodiments, disclosed is an antenna system including a tunable medium, wherein the tunable medium is located in front of a plurality of near-end EM radiating elements with a front side of the plurality of near-end EM radiating elements facing generally towards a plurality of far-end EM radiating elements.

In some embodiments, disclosed is an antenna system including control circuitry including a controller operably coupled to a tunable medium, wherein the controller is programmed to control the tunable medium to scatter EM radiation at least substantially in a forward direction relative to a plurality of near-end radiating elements.

In some embodiments, disclosed is an antenna system including control circuitry including a controller operably coupled to a tunable medium, wherein the controller is programmed to control the tunable medium to scatter EM radiation at least substantially in a backward direction relative to a plurality of near-end EM radiating elements.

In some embodiments, disclosed is an antenna system including control circuitry including a controller operably coupled to a tunable medium, wherein the controller is programmed to control the tunable medium to scatter EM radiation at least substantially in a direction of a specular reflection relative to a surface of a body carrying a plurality of near-end EM radiating elements.

In some embodiments, disclosed is an antenna system including control circuitry including a controller operably coupled to a tunable medium, wherein the controller is programmed to control the tunable medium to scatter EM radiation at least substantially in a direction towards a plurality of far-end EM radiating elements.

In some embodiments, disclosed is an antenna system including a tunable medium, wherein the tunable medium at least partially surrounds at least a portion of a plurality of near-end EM radiating elements.

In some embodiments, disclosed is an antenna system including a tunable medium, wherein the tunable medium includes a tunable radome.

In some embodiments, disclosed is an antenna system including a controller, wherein the controller is programmed to dynamically tune a tunable medium to function as a linear beamforming precoder.

In some embodiments, disclosed is an antenna system including a controller, wherein the controller is programmed to dynamically tune a tunable medium to function as a linear beamforming decoder.

In some embodiments, disclosed is an antenna system including a controller, wherein the controller is programmed to dynamically tune a tunable medium to function as a linear spatial-diversity precoder.

In some embodiments, disclosed is an antenna system including a controller, wherein the controller is programmed to dynamically tune a tunable medium to function as a linear spatial-diversity decoder.

In some embodiments, disclosed is an antenna system including a controller, wherein the controller is programmed to dynamically tune a tunable medium to function as a linear spatial multiplexing precoder.

In some embodiments, disclosed is an antenna system including a controller, wherein the controller is programmed to dynamically tune a tunable medium to function as a linear spatial multiplexing decoder.

In some embodiments, disclosed is an antenna system including a controller, wherein the controller is programmed to dynamically determine a channel matrix of channels between a plurality of near-end EM radiating elements and a plurality of far-end EM radiating elements, and dynamically tune a tunable medium as a function of the determined channel matrix.

In some embodiments, disclosed is an antenna system including a controller operably coupled to a tunable medium, wherein the controller is programmed to determine values of control parameters of the tunable medium.

In some embodiments, disclosed is an antenna system including a controller operably coupled to a tunable medium, wherein the controller is programmed to determine values of control parameters of the tunable medium by solving an inverse scattering problem, wherein the inverse scattering problem is postulated as an equality between a determined extended channel matrix and a desired extended channel matrix.

In some embodiments, disclosed is an antenna system including a controller operably coupled to a tunable medium, wherein the controller is programmed to determine values of control parameters of the tunable medium by determining a minimization of a matrix norm of a difference between a determined extended channel matrix and a desired extended channel matrix.

In some embodiments, disclosed is an antenna system including a controller operably coupled to a tunable medium, wherein the controller is programmed to determine values of control parameters of the tunable medium by determining a minimization of a sum of squared differences between at least a portion of values from a determined extended channel matrix and corresponding values of a desired extended channel matrix.

In some embodiments, disclosed is an antenna system including a controller operably coupled to a tunable medium, wherein the controller is programmed to determine values of control parameters of the tunable medium by determining a minimization of a sum of squared differences between at least a portion of values from a determined extended channel matrix and corresponding values of a desired extended channel matrix, plus a weighted sum of frequency dispersion magnitudes of the portion of values.

In some embodiments, disclosed is an antenna system including a controller, wherein the controller is programmed such that a precoder matrix of a tunable medium is at least approximately equal to $U^\dagger$, where $U\Sigma V^\dagger$ is a singular value decomposition of a determined channel matrix, and $U^\dagger$ is the conjugate transpose of unitary matrix U.

In some embodiments, disclosed is an antenna system including a controller, wherein the controller is programmed such that a decoder matrix of a tunable medium is at least approximately equal to V, where $U\Sigma V^\dagger$ is a singular value decomposition of a determined channel matrix, and V is the conjugate transpose of unitary matrix $V^\dagger$.

In some embodiments, disclosed is an antenna system including a controller, wherein the controller is programmed such that a precoder matrix of a tunable medium is at least approximately equal to a left pseudo-inverse of a determined channel matrix.

In some embodiments, disclosed is an antenna system including a controller, wherein the controller is programmed such that a decoder matrix of a tunable medium is at least approximately equal to a right pseudo-inverse of a determined channel matrix.

In some embodiments, disclosed is an antenna system including a controller, wherein the controller is programmed such that a precoder matrix of a tunable medium multiplied by a determined channel matrix produces a matrix that is approximately equal to a diagonal matrix.

In some embodiments, disclosed is an antenna system including a controller, wherein the controller is programmed such that a determined channel matrix multiplied by a decoder matrix of a tunable medium produces a matrix that is approximately equal to a diagonal matrix.

In some embodiments, disclosed is an antenna system including a controller, wherein the controller is programmed such that a precoder matrix of a tunable medium multiplied by a determined channel matrix produces a matrix having off-diagonal elements, wherein a magnitude of each of the off-diagonal elements is less than or equal to a predetermined threshold value.

In some embodiments, disclosed is an antenna system including a controller, wherein the controller is programmed such that a determined channel matrix multiplied by a decoder matrix of a tunable medium produces a matrix having off-diagonal elements, wherein a magnitude of each of the off-diagonal elements is less than or equal to a predetermined threshold value.

In some embodiments, disclosed is an antenna system including a controller, wherein the controller is programmed such that a matrix product between a precoder matrix of a tunable medium and a determined channel matrix multiplied by a decoder matrix of a far-end decoder is approximately equal to a diagonal matrix.

In some embodiments, disclosed is an antenna system including a controller, wherein the controller is programmed such that a matrix product between a precoder matrix of a far-end precoder and a determined channel matrix multiplied by a decoder matrix of a tunable medium is approximately equal to a diagonal matrix.

In some embodiments, disclosed is an antenna system including a controller, wherein the controller is programmed such that a matrix product between a precoder matrix of a tunable medium and a determined channel matrix multiplied by a decoder matrix of a far-end decoder results in a matrix having off-diagonal elements, wherein a magnitude of each of the off-diagonal elements is less than or equal to a predetermined threshold value.

In some embodiments, disclosed is an antenna system including a controller, wherein the controller is programmed such that a matrix product between a precoder matrix of a far-end precoder and a determined channel matrix multiplied by a decoder matrix of the tunable medium results in a matrix having off-diagonal elements, wherein a magnitude of each of the off-diagonal elements is less than or equal to a predetermined threshold value.

In some embodiments, disclosed is a method of operating an antenna system. The method includes operating a plurality of near-end electromagnetic (EM) radiating elements, and scattering EM radiation transmitted between the plurality of near-end EM radiating elements and a plurality of far-end EM radiating elements with a tunable medium. The method also includes modifying EM properties of the tunable medium to modify the EM radiation transmitted between the plurality of near-end EM radiating elements and the plurality of far-end EM radiating elements.

In some embodiments, disclosed is a method of operating an antenna system including modifying EM properties of a tunable medium, wherein modifying EM properties of a tunable medium includes dynamically modifying the EM properties of the tunable medium during operation of the antenna system.

In some embodiments, disclosed is a method of operating an antenna system including modifying EM properties of a tunable medium, wherein modifying EM properties of a tunable medium includes pre-selecting a state of the tunable medium and holding the tunable medium in the selected state during operation of the antenna system.

In some embodiments, disclosed is a method of operating an antenna system including delivering EM signals including a plurality of different data streams to a plurality of near-end EM radiating elements for transmission to a plurality of far-end EM radiating elements.

In some embodiments, disclosed is a method of operating an antenna system including receiving EM signals including a plurality of different data streams from a plurality of far-end EM radiating elements through a plurality of near-end EM radiating elements.

In some embodiments, disclosed is a method of operating an antenna system including delivering EM signals, wherein delivering EM signals includes delivering the EM signals to a plurality of near-end EM radiating elements for transmission to a plurality of far-end EM radiating elements distributed between at least two physically separate devices.

In some embodiments, disclosed is a method of operating an antenna system including receiving EM signals, wherein receiving EM signals includes receiving the EM signals from a plurality of far-end EM radiating elements distributed between at least two physically separate devices.

In some embodiments, disclosed is a method of operating an antenna system including delivering EM signals, wherein delivering EM signals includes delivering EM signals including a number of different data streams that is equal to a number of a plurality of far-end EM radiating elements, each of the plurality of far-end EM radiating elements receiving only one of the plurality of data streams.

In some embodiments, disclosed is a method of operating an antenna system including receiving EM signals, wherein receiving EM signals includes receiving EM signals including a number of different data streams that is equal to a number of a plurality of far-end EM radiating elements, and each of the plurality of far-end EM radiating elements transmits only one of the plurality of data streams.

In some embodiments, disclosed is a method of operating an antenna system including delivering EM signals, wherein delivering EM signals includes delivering EM signals including a number of different data streams that is less than a number of a plurality of far-end EM radiating elements.

In some embodiments, disclosed is a method of operating an antenna system including receiving EM signals, wherein receiving EM signals includes receiving EM signals including a number of different data streams that is less than a number of a plurality of far-end EM radiating elements.

In some embodiments, disclosed is a method of operating an antenna system including delivering EM signals, wherein delivering EM signals includes delivering EM signals including a number of different data streams that is equal to a number of a plurality of near-end EM radiating elements.

In some embodiments, disclosed is a method of operating an antenna system including receiving EM signals, wherein receiving EM signals includes receiving EM signals including a number of different data streams that is equal to a number of a plurality of near-end EM radiating elements.

In some embodiments, disclosed is a method of operating an antenna system including delivering EM signals, wherein delivering EM signals includes delivering EM signals including a number of different data streams that is less than a number of a plurality of near-end EM radiating elements.

In some embodiments, disclosed is a method of operating an antenna system including receiving EM signals, wherein receiving EM signals includes receiving EM signals including a number of different data streams that is less than a number of a plurality of near-end EM radiating elements.

In some embodiments, disclosed is a method of operating an antenna system including operating a plurality of near-end EM radiating elements, wherein operating a plurality of near-end EM radiating elements includes operating at least one dipole antenna.

In some embodiments, disclosed is a method of operating an antenna system including operating a plurality of near-end EM radiating elements, wherein operating a plurality of near-end EM radiating elements includes operating an at least substantially omnidirectional antenna.

In some embodiments, disclosed is a method of operating an antenna system including operating an at least substantially omnidirectional antenna, wherein operating an at least substantially omnidirectional antenna includes operating a dipole antenna that is at least substantially omnidirectional in a plane perpendicular to the dipole antenna.

In some embodiments, disclosed is a method of operating an antenna system including operating a plurality of near-end EM radiating elements, wherein operating a plurality of near-end EM radiating elements includes operating at least one patch antenna.

In some embodiments, disclosed is a method of operating an antenna system including operating a plurality of near-end EM radiating elements, wherein operating a plurality of near-end EM radiating elements includes operating at least one aperture antenna.

In some embodiments, disclosed is a method of operating an antenna system including operating a plurality of near-end EM radiating elements, wherein operating a plurality of near-end EM radiating elements includes operating a plurality of antenna arrays.

In some embodiments, disclosed is a method of operating an antenna system including scattering EM radiation with a tunable medium, wherein scattering EM radiation with a tunable medium includes scattering the EM radiation with a tunable metamaterial including a plurality of tunable EM scattering elements.

In some embodiments, disclosed is a method of operating an antenna system including scattering EM radiation with a tunable metamaterial including a plurality of tunable EM scattering elements, wherein scattering EM radiation with a tunable metamaterial including a plurality of tunable EM scattering elements includes scattering the EM radiation with at least one tunable-impedance two-port lumped circuit element.

In some embodiments, disclosed is a method of operating an antenna system including scattering EM radiation with a tunable metamaterial including a plurality of tunable EM scattering elements, wherein scattering EM radiation with a tunable metamaterial including a plurality of tunable EM scattering elements includes scattering the EM radiation with a plurality of tunable capacitive elements.

In some embodiments, disclosed is a method of operating an antenna system including scattering EM radiation with a plurality of tunable capacitive elements, wherein scattering EM radiation with a plurality of tunable capacitive elements includes scattering the EM radiation with at least one of diodes and transistors.

In some embodiments, disclosed is a method of operating an antenna system including scattering EM radiation with a plurality of tunable capacitive elements, wherein scattering EM radiation with a plurality of tunable capacitive elements includes scattering the EM radiation with at least one variable dielectric constant material.

In some embodiments, disclosed is a method of operating an antenna system including scattering EM radiation with a plurality of tunable capacitive elements, wherein scattering EM radiation with a plurality of tunable capacitive elements includes scattering the EM radiation with at least one liquid crystal element.

In some embodiments, disclosed is a method of operating an antenna system including scattering EM radiation with a tunable metamaterial including a plurality of tunable EM scattering elements, wherein scattering EM radiation with a tunable metamaterial including a plurality of tunable EM scattering elements includes scattering the radiation with a plurality of variable resistive elements.

In some embodiments, disclosed is a method of operating an antenna system including scattering EM radiation with a plurality of variable resistive elements, wherein scattering EM radiation with a plurality of variable resistive elements includes scattering the radiation with at least one of diodes and transistors.

In some embodiments, disclosed is a method of operating an antenna system including scattering EM radiation with a tunable metamaterial including a plurality of tunable EM scattering elements, wherein scattering EM radiation with a tunable metamaterial including a plurality of tunable EM scattering elements includes scattering the radiation with a plurality of variable inductance elements.

In some embodiments, disclosed is a method of operating an antenna system including scattering EM radiation with a tunable medium, wherein scattering EM radiation with a tunable medium includes scattering the EM radiation with a tunable medium that is tunable with a number of degrees of freedom that is greater than or equal to a number of independent elements of a channel matrix of channels between a plurality of near-end EM radiating elements and a plurality of far-end EM radiating elements.

In some embodiments, disclosed is a method of operating an antenna system including operating a plurality of near-end EM radiating elements, wherein operating a plurality of near-end EM radiating elements includes operating the plurality of near-end EM radiating elements with a tunable medium located in front of the plurality of near-end EM radiating elements with a front side of the plurality of near-end EM radiating elements facing generally towards a plurality of far-end EM radiating elements.

In some embodiments, disclosed is a method of operating an antenna system including scattering EM radiation transmitted between a plurality of near-end EM radiating elements and a plurality of far-end EM radiating elements, wherein scattering EM radiation transmitted between the plurality of near-end EM radiating elements and a plurality of far-end EM radiating elements includes scattering the EM radiation at least substantially in a forward direction relative to the plurality of near-end EM radiating elements.

In some embodiments, disclosed is a method of operating an antenna system including scattering EM radiation transmitted between a plurality of near-end EM radiating elements and a plurality of far-end EM radiating elements, wherein scattering EM radiation transmitted between the plurality of near-end EM radiating elements and a plurality of far-end EM radiating elements includes scattering the EM radiation at least substantially in a backward direction relative to the plurality of near-end EM radiating elements.

In some embodiments, disclosed is a method of operating an antenna system including scattering EM radiation transmitted between a plurality of near-end EM radiating elements and a plurality of far-end EM radiating elements, wherein scattering EM radiation transmitted between the plurality of near-end EM radiating elements and a plurality of far-end EM radiating elements includes scattering the EM radiation at least substantially in a direction of a specular reflection relative to a surface of a body carrying the plurality of near-end EM radiating elements.

In some embodiments, disclosed is a method of operating an antenna system including scattering EM radiation transmitted between a plurality of near-end EM radiating elements and a plurality of far-end EM radiating elements, wherein scattering EM radiation transmitted between the plurality of near-end EM radiating elements and a plurality of far-end EM radiating elements includes comprises scattering the EM radiation at least substantially in a direction towards the plurality of far-end EM radiating elements.

In some embodiments, disclosed is a method of operating an antenna system including operating a plurality of near-end EM radiating elements, wherein operating a plurality of near-end EM radiating elements includes operating the plurality of near-end EM radiating elements with a tunable medium at least partially surrounding at least a portion of the plurality of near-end EM radiating elements.

In some embodiments, disclosed is a method of operating an antenna system including operating a plurality of near-end EM radiating elements with a tunable medium at least partially surrounding at least a portion of the plurality of near-end EM radiating elements, wherein operating the plurality of near-end EM radiating elements with the tunable medium at least partially surrounding at least a portion of the plurality of near-end EM radiating elements includes operating the plurality of near-end radiating elements inside of a tunable radome including the tunable medium.

In some embodiments, disclosed is a method of operating an antenna system, the method including dynamically tuning a tunable medium to function as a linear beamforming precoder.

In some embodiments, disclosed is a method of operating an antenna system, the method including dynamically tuning a tunable medium to function as a linear beamforming decoder.

In some embodiments, disclosed is a method of operating an antenna system, the method including dynamically tuning the tunable medium to function as a linear spatial-diversity precoder.

In some embodiments, disclosed is a method of operating an antenna system, the method including dynamically tuning the tunable medium to function as a linear spatial-diversity decoder.

In some embodiments, disclosed is a method of operating an antenna system, the method including dynamically tuning a tunable medium to function as a linear spatial multiplexing precoder.

In some embodiments, disclosed is a method of operating an antenna system, the method including dynamically tuning a tunable medium to function as a linear spatial multiplexing decoder.

In some embodiments, disclosed is a method of operating an antenna system including dynamically tuning a tunable medium to function as a linear spatial multiplexing precoder, wherein dynamically tuning a tunable medium to function as a linear spatial multiplexing precoder includes dynamically determining a channel matrix of channels between a plurality of near-end EM radiating elements and a plurality of far-end EM radiating elements, and dynamically tuning the tunable medium as a function of the determined channel matrix.

In some embodiments, disclosed is a method of operating an antenna system including dynamically tuning a tunable medium to function as a linear spatial multiplexing decoder, wherein dynamically tuning the tunable medium to function as a linear spatial multiplexing decoder includes dynamically determining a channel matrix of channels between a plurality of near-end EM radiating elements and a plurality of far-end EM radiating elements, and dynamically tuning the tunable medium as a function of the determined channel matrix.

In some embodiments, disclosed is a method of operating an antenna system including dynamically tuning the tunable medium as a function of a determined channel matrix, wherein dynamically tuning a tunable medium as a function of a determined channel matrix comprises determining values of control parameters of the tunable medium.

In some embodiments, disclosed is a method of operating an antenna system including determining values of control parameters of a tunable medium, wherein determining values of control parameters of a tunable medium includes solving an inverse scattering problem, wherein the inverse scattering problem is postulated as an equality between a determined extended channel matrix and a desired extended channel matrix.

In some embodiments, disclosed is a method of operating an antenna system including determining values of control parameters of a tunable medium, wherein determining values of control parameters of a tunable medium includes determining a minimization of a matrix norm of a difference between a determined extended channel matrix and a desired extended channel matrix.

In some embodiments, disclosed is a method of operating an antenna system including determining values of control parameters of a tunable medium, wherein determining values of control parameters of a tunable medium includes determining a minimization of a sum of squared differences between at least a portion of values from a determined extended channel matrix and corresponding values of a desired extended channel matrix.

In some embodiments, disclosed is a method of operating an antenna system including determining values of control parameters of a tunable medium, wherein determining values of control parameters of a tunable medium includes determining a minimization of a sum of squared differences between at least a portion of values from a determined extended channel matrix and corresponding values of a desired extended channel matrix, plus a weighted sum of frequency dispersion magnitudes of the portion of values.

In some embodiments, disclosed is a method of operating an antenna system including dynamically tuning a tunable medium as a function of a determined channel matrix, wherein dynamically tuning a tunable medium as a function of a determined channel matrix includes tuning the tunable medium such that a precoder matrix of the tunable medium is at least approximately equal to $U^\dagger$, where $U\Sigma V^\dagger$ is a singular value decomposition of the determined channel matrix, and $U^\dagger$ is the conjugate transpose of unitary matrix U.

In some embodiments, disclosed is a method of operating an antenna system including dynamically tuning a tunable medium as a function of a determined channel matrix, wherein dynamically tuning the tunable medium as a function of the determined channel matrix includes tuning the tunable medium such that a decoder matrix of the tunable medium is at least approximately equal to V, where $U\Sigma V^\dagger$ is a singular value decomposition of the determined channel matrix, and V is the conjugate transpose of unitary matrix $V^\dagger$.

In some embodiments, disclosed is a method of operating an antenna system including dynamically tuning a tunable medium as a function of a determined channel matrix, wherein dynamically tuning a tunable medium as a function of a determined channel matrix includes tuning the tunable medium such that a precoder matrix of the tunable medium is at least approximately equal to a left pseudo-inverse of the determined channel matrix.

In some embodiments, disclosed is a method of operating an antenna system including dynamically tuning a tunable medium as a function of a determined channel matrix, wherein dynamically tuning the tunable medium as a function of the determined channel matrix includes tuning the tunable medium such that a decoder matrix of the tunable medium is at least approximately equal to a right pseudo-inverse of the determined channel matrix.

In some embodiments, disclosed is a method of operating an antenna system including dynamically tuning a tunable medium as a function of a determined channel matrix, wherein dynamically tuning a tunable medium as a function of a determined channel matrix includes tuning the tunable medium such that a precoder matrix of the tunable medium multiplied by the determined channel matrix produces a matrix that is approximately equal to a diagonal matrix.

In some embodiments, disclosed is a method of operating an antenna system including dynamically tuning a tunable medium as a function of a determined channel matrix, wherein dynamically tuning the tunable medium as a function of the determined channel matrix includes tuning the tunable medium such that the determined channel matrix multiplied by a decoder matrix of the tunable medium produces a matrix that is approximately equal to a diagonal matrix.

In some embodiments, disclosed is a method of operating an antenna system including dynamically tuning a tunable medium as a function of a determined channel matrix, wherein dynamically tuning a tunable medium as a function of a determined channel matrix includes tuning the tunable medium such that a precoder matrix of the tunable medium multiplied by the determined channel matrix produces a matrix having off-diagonal elements, wherein a magnitude of each of the off-diagonal elements is less than or equal to a predetermined threshold value.

In some embodiments, disclosed is a method of operating an antenna system including dynamically tuning a tunable medium as a function of a determined channel matrix, wherein dynamically tuning the tunable medium as a function of the determined channel matrix includes tuning the tunable medium such that the determined channel matrix multiplied by a decoder matrix of the tunable medium produces a matrix having off-diagonal elements, wherein a magnitude of each of the off-diagonal elements is less than or equal to a predetermined threshold value.

In some embodiments, disclosed is a method of operating an antenna system including dynamically tuning a tunable medium as a function of a determined channel matrix, wherein dynamically tuning a tunable medium as a function of a determined channel matrix includes tuning the tunable medium such that a matrix product between a precoder matrix of the tunable medium and the determined channel matrix multiplied by a decoder matrix of a far-end decoder is approximately equal to a diagonal matrix.

In some embodiments, disclosed is a method of operating an antenna system including dynamically tuning a tunable medium as a function of a determined channel matrix, wherein dynamically tuning a tunable medium as a function of the determined channel matrix includes tuning the tunable medium such that a matrix product between a precoder matrix of a far-end precoder and the determined channel matrix multiplied by a decoder matrix of the tunable medium is approximately equal to a diagonal matrix.

In some embodiments, disclosed is a method of operating an antenna system including dynamically tuning a tunable medium as a function of a determined channel matrix, wherein dynamically tuning a tunable medium as a function of a determined channel matrix includes tuning the tunable medium such that a matrix product between a precoder matrix of the tunable medium and the determined channel matrix multiplied by a decoder matrix of a far-end decoder results in a matrix having off-diagonal elements, wherein a magnitude of each of the off-diagonal elements is less than or equal to a predetermined threshold value.

In some embodiments, disclosed is a method of operating an antenna system including dynamically tuning a tunable medium as a function of a determined channel matrix, wherein dynamically tuning a tunable medium as a function of a determined channel matrix includes tuning the tunable medium such that a matrix product between a precoder matrix of a far-end precoder and the determined channel matrix multiplied by a decoder matrix of the tunable medium results in a matrix having off-diagonal elements, wherein a magnitude of each of the off-diagonal elements is less than or equal to a predetermined threshold value.

FIG. 1 is a simplified block diagram of an antenna system 100 including a plurality of near-end electromagnetic (EM) radiating elements 102-1, 102-2, 102-3, . . . 102-N (sometimes referred to herein generally together as "near-end EM radiating elements" 102, and individually as "near-end EM radiating element" 102) located at a near-end location, and a plurality of far-end EM radiating elements 104-1, 104-2, 104-3, . . . 104-M (sometimes referred to herein generally together as "far-end EM radiating elements" 104, and individually as "far-end EM radiating element" 104) located at one or more far-end locations.

The antenna system 100 also includes a tunable medium 200, and control circuitry 110 operably coupled to the tunable medium 200 and at least a portion of the near-end EM radiating elements 102 (e.g., some of the near-end EM radiating elements may function as reflectors instead of radiators, in some instances). The tunable medium 200 is positioned relative to the near-end EM radiating elements 102 and the far-end EM radiating elements 104 to scatter EM radiation 106 transmitted between the near-end EM radiating elements 102 and the far-end EM radiating elements 104. The control circuitry 110 includes a controller 112 programmed to modify EM properties of the tunable medium 200 to modify the EM radiation 106 transmitted between the near-end EM radiating elements 102 and the far-end EM radiating elements 104.

In some embodiments, the controller 112 is programmed to dynamically (e.g., on the order of a fraction of minutes) modify the EM properties of the tunable medium 200 to dynamically modify the EM radiation 106 transmitted between the near-end EM radiating elements 102 and the far-end EM radiating elements 104 during operation of the antenna system 100. In some embodiments, the controller 112 is programmed to pre-select a state of the tunable medium 200 and hold the tunable medium 200 in the pre-selected state during operation of the antenna system 100. Regardless of whether the controller 112 is programmed to dynamically modify or pre-select the EM properties of the tunable medium 200, the tunable medium 200 may function as a linear coder. When the near-end EM radiating elements 102 function as transmitting EM radiating elements, the tunable medium 200 may function as a linear precoder. Also, when the near-end EM radiating elements 102 function as receiving EM radiating elements, the tunable medium 200 may function as a linear decoder.

The controller 112 may be programmed to control the tunable medium 200. For example, the controller 112 may be programmed to control the tunable medium 200 to function as a linear beamforming coder, a linear spatial-diversity coder, a linear spatial multiplexing coder, or combinations thereof. Also, the controller 112 may be programmed to function as a precoder (e.g., while the near-end EM radiating elements 102 are transmitting), a decoder (e.g., while the near-end radiating elements 102 are receiving), or a combination thereof.

The control circuitry 110 may also include signal generation circuitry 114 operably coupled to the near-end EM radiating elements 102. The signal generation circuitry 114 is configured to deliver EM signals including data streams to the near-end EM radiating elements 102 for transmission to the far-end EM radiating elements 104.

The control circuitry 110 may further include signal processing circuitry 116 operably coupled to the near-end EM radiating elements 102. The signal processing circuitry 116 is configured to receive EM signals including data streams from the far-end EM radiating elements 104 through the near-end EM radiating elements 102.

The disclosure contemplates various arrangements of the near-end EM radiating elements 102 and the far-end EM radiating elements 104. By way of non-limiting example, the far-end EM radiating elements 104 may be distributed among at least two physically separate devices (e.g., a plurality of different mobile devices) (e.g., one far-end EM radiating element 104 per device, more than one far-end EM radiating element 104 per device, or combinations thereof). Also by way of non-limiting example, the far-end EM radiating elements 104 may all be included in the same physical device. Similarly, the near-end EM radiating elements 102 may be distributed among at least two physically separate devices, or may all be included in the same physical device (with one or more tunable media 200).

In some embodiments, a number of the data streams is equal to a number of the far-end EM radiating elements 104, and each of the far-end EM radiating elements 104 receives only one of the data streams. Also, in some embodiments, the number of the data streams is less than the number of the far-end EM radiating elements 104. Furthermore, in some embodiments, a number of the near-end EM radiating elements 102 is equal to the number of the data streams. Moreover, in some embodiments, the number of the near-end EM radiating elements 102 is greater than a number of the data streams.

Figure 2:
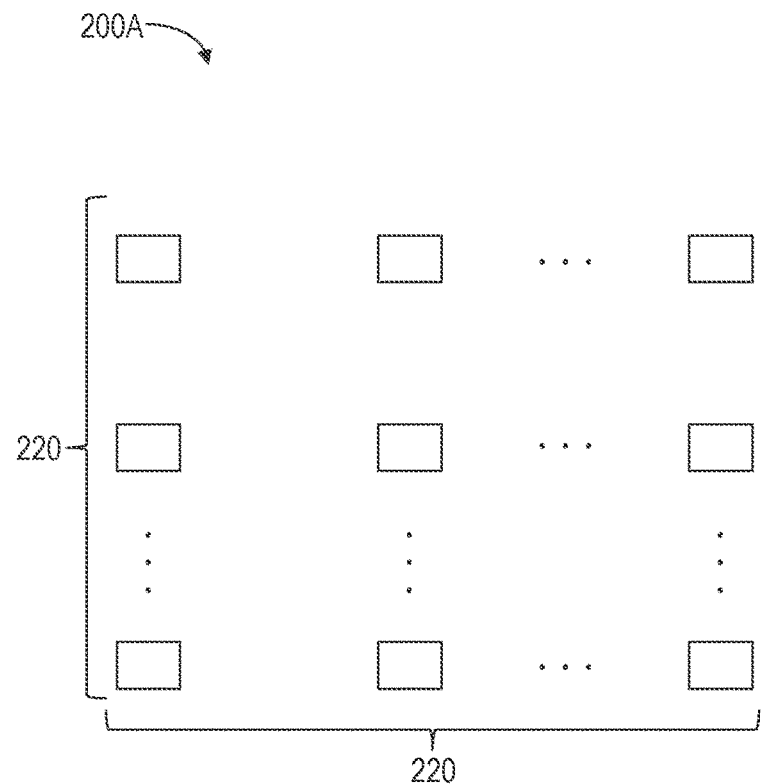
FIG. 2 is a simplified view of a segment of an example of a tunable medium of the antenna system of FIG. 1.

FIG. 2 is a simplified view of a segment 200A of an example of the tunable medium 200 of FIG. 1. In this example, the tunable medium 200 includes a tunable metamaterial including a plurality of tunable EM scattering elements 220 (hereinafter "tunable EM scattering elements" 220), as shown in the segment 200A. As used herein, the term "metamaterial" refers to a tunable medium including EM scattering elements spaced at sub-wavelength dimensions of an operational frequency of associated EM radiating elements. By way of non-limiting example, the plurality of tunable EM scattering elements 220 may include short dipoles, resonant dipoles, magnetic dipoles, other elements, and combinations thereof. In the example shown in FIG. 2, the tunable EM scattering elements 220 are arranged uniformly apart in a two-dimensional arrangement. It is contemplated, however, in the scope of the disclosure that one-dimensional, or even three-dimensional arrangements of the EM scattering elements 220 may be used. Furthermore, it is contemplated that uniform and non-uniform arrangements may be used in conjunction with any number of spatial dimensions.

In some embodiments, at least one of the tunable EM scattering elements 220 includes a tunable-impedance two-port lumped circuit element. In such embodiments, an expanded S-matrix approach may be used to account for mutual coupling between the tunable EM scattering elements, and reduce computational complexity. In some embodiments, at least one of the tunable EM scattering elements 220 includes a tunable capacitive element (e.g., a diode, a transistors, a variable dielectric constant material, a liquid crystal, etc.) In some embodiments, at least one of the tunable scattering elements 220 includes a variable resistive element (e.g., a diode, a transistor, etc.). In some embodiments, at least one of the tunable scattering elements 220 includes a variable inductance element.

In order to implement demultiplexing, off-diagonal elements of a product between a precoder matrix A, a channel matrix H, and a decoder (if any) matrix B may be decreased below a predetermined interference tolerance, cancelled, or a combination thereof. There may be $N_{od}=D(D-1)/2$ of such off-diagonal elements.

Minimization (e.g., cancelation) of these off-diagonal elements of AHB (B=I where there is no decoder) may be achieved by applying one or more tunable media 200A (e.g., metamaterial) layers with a total of $N_v \geq N_{od}$ degrees of freedom. For example, one layer with $N_1$ degree of freedom may be applied as a precoder and another with $N_2$ degrees of freedom may be applied as a decoder, where $N_1+N_2=N_v$. As a specific, non-limiting example, only one layer with $N_v$ degrees of freedom may be applied at the near-end EM radiating elements 102 (FIG. 1). In some embodiments, however, any number of intermediate layers may be used in the system 100 (FIG. 1), with demultiplexing distributed among the various layers. In embodiments where demultiplexing is performed using the tunable medium 200A, a minimum number $N_v$ of degrees of freedom to achieve demultiplexing may scale quadratically with the number of data streams D.

Referring once again to FIG. 1, various configurations of the tunable medium 200 are contemplated. In some embodiments, a tunable medium 200 embodied in a single physical body may be used. In some embodiments, the tunable medium 200 may be divided into more than one physical body (e.g., spread across spread-out near-end EM radiating elements 102, positioned so that the EM radiation 106 passes through multiple tunable media 200, etc.). In some embodiments, the tunable medium is located in front of the near-end EM radiating elements 102 with a front side of the near-end EM radiating elements 102 facing generally towards the plurality of far-end EM radiating elements 104.

In some embodiments, the near-end EM radiating elements 102 may function as transmitters. By way of non-limiting example, the controller 112 may be programmed to control the tunable medium 200 to scatter EM radiation 106 transmitted by the near-end EM scattering elements 102 at least substantially in a forward direction relative to the plurality of near-end radiating elements 102 (forward transmission mode). As used herein, the term "at least substantially in a forward direction" refers to directions within about ten degrees of a front surface of a body carrying the near-end EM radiating elements 102. Also by way of non-limiting example, the controller 112 may be programmed to control the tunable medium 200 to scatter the EM radiation 106 at least substantially in a backward direction relative to the near-end EM radiating elements 102 (reflective backer mode). As used herein, the term "at least substantially in a backward direction" refers to a direction about 180 degrees from the at least substantially forward direction. As another non-limiting example, the controller 112 may be programmed to control the tunable medium 200 to scatter the EM radiation 106 at least substantially (i.e., within about 10 degrees) in a direction of a specular reflection relative to a surface of the body carrying the plurality of near-end EM radiating elements 102 (specular reflector at an arbitrary position). As a further, non-limiting example, the controller 112 may be programmed to control the tunable medium 200 to scatter the EM radiation at least substantially (i.e., within about 10 degrees) in a direction towards the far-end EM radiating elements 104 (arbitrary-angle reflector, arbitrary position). Accordingly, the controller 112 may be programmed to operate the tunable medium 200 in "transmission" mode, but may also be programmed to operate the tunable medium 200 in "reflection" mode or "non-specular reflection" mode.

In some embodiments, the tunable medium 200 at least partially surrounds at least a portion of the near-end EM radiating elements 102. By way of non-limiting example, the tunable medium 200 may include a tunable radome including the tunable medium 200.

Figure 3:
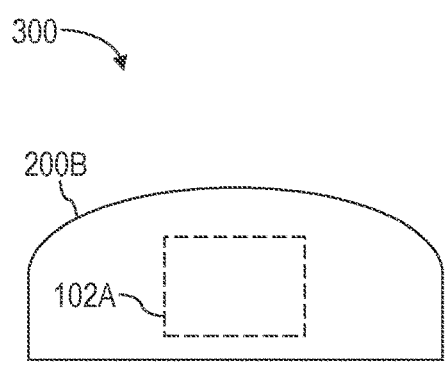
FIG. 3 illustrates a simplified view of a tunable radome.

FIG. 3 illustrates a simplified view of a tunable radome 300. The tunable radome 300 includes a tunable medium 200B at least partially surrounding near-end EM radiating elements 102A. In some embodiments, only a portion of the tunable radome 300 may include the tunable medium 200B. In some embodiments, however, at least substantially all (e.g., all) of the tunable radome 300 may be made of the tunable medium 200B.

Referring once again to FIG. 1, in some embodiments, the controller 112 may be programmed to determine (e.g., dynamically for a dynamic channel, statically for a static channel) a channel matrix H of channels between the near-end EM radiating elements 102 and the far-end EM radiating elements 104 (neglecting effects of the tunable medium 200), and tune (e.g., dynamically) the tunable medium 200 as a function of the determined channel matrix H. In some embodiments, the channel matrix H may be determined by at least one of transmitting and receiving one or more training signals, and analyzing received signal strength indicators (RSSIs) corresponding to the training signals. In some embodiments, the channel matrix may be determined at the far-end, and information including the channel matrix may be received by the control circuitry 110. In some embodiments, the control circuitry 110 may store (e.g., in data storage) information indicating past determined channel matrices, and select one of the past determined channel matrices for current use.

While the near-end EM radiating elements 102 are transmitting, the channel matrix H may include an N by M complex matrix (where N is a number of the near-end EM radiating elements 102 and M is the number of the far-end EM radiating elements 104), and each element $h_{ab}$ including a fading coefficient of a channel from an $a^{th}$ near-end EM radiating element 102 to a $b^{th}$ far-end EM radiating element 104, neglecting effects of the tunable medium 200. The channel matrix H describes linear relationships between the currents on transmitting EM radiating elements (e.g., the near-end EM radiating elements 102) and receiving EM radiating elements (e.g., the far-end EM radiating elements 104). The channel matrix H is a discrete form of the Green's function of the channel. If the transmit and receive EM radiating elements are viewed as input and output ports, respectively, the channel matrix H is also the same as the S-parameter matrix of a port network. In other words, a matrix product of a vector of near-end transmit signals X and the channel matrix H plus any noise W produces a vector of far-end receive signals Y, or equivalently Y=XH+W, again, neglecting the tunable medium 200.

The tunable medium 200 provides the ability to precode the transmit signals X. Specifically, the tunable medium 200 may be tuned to modify the receive signals Y received at the far-end radiating elements 104. For example, the receive signals Y may be expressed as a product of transmit signals X and a precoder matrix A of the tunable medium 200 multiplied by the channel matrix H, plus any noise W, or Y=XAH+W. As another example, the receive signals Y may be expressed as a product of transmit signals X, a precoder matrix A of the tunable medium 200, the channel matrix H, and a decoder matrix B of a tunable medium 200 at the far-end (not shown), plus any noise W, or Y=XAHB+W. The product of the channel matrix H with any coder matrices (A, B, or a combination thereof) may be referred to herein as an "extended channel matrix" (e.g., AH, AHB), or H'.

In some embodiments, the controller 112 may be programmed to determine control parameters of the tunable medium 200 that result in approximately a desired extended channel matrix H'. By way of non-limiting example, the control parameters may be determined by solving an inverse scattering problem, with the inverse scattering problem postulated as an equality between a determined extended channel matrix $H'^{DET}$ and a desired extended channel matrix $H'^{GOAL}$ ($H'^{DET}=H'^{GOAL}$). For example, in some embodiments, the inverse scattering problem may be postulated as a minimization problem for the matrix norm of the difference between determined channel matrix $H'^{DET}$ and the desired extended channel matrix $H'^{GOAL}$ ($\min\|H'^{DET}-H'^{GOAL}\|$, $\min\|H'^{GOAL}-H'^{DET}\|$, etc.). In some embodiments, the inverse scattering problem may be postulated as a least-squares problem with a minimization goal represented as a sum of squared differences between selected components (e.g., all the components, a portion of the components, etc.) of the determined extended channel matrix $H'^{DET}$ and corresponding components of the desired extended channel matrix $H'^{GOAL}$, or $\min_{\vec{p}} \Sigma_{(i,j)} |H'^{DET}_{ij}(\vec{p}) - H'^{GOAL}_{ij}|^2$. In some embodiments, the inverse scattering problem may be postulated as a least-squares problem with a minimization goal represented as a sum of squared differences between selected components (e.g., all the components, a portion of the components, etc.) of the determined extended channel matrix $H'^{DET}$ and corresponding components of the desired extended channel matrix $H'^{GOAL}$ plus a weighted sum of frequency dispersion magnitudes of the selected components, or:

$$\min_{\vec{p}} \sum_{(i,j)} \left\{ |H'^{DET}_{ij}(\vec{p}) - H'^{GOAL}_{ij}|^2 + w_{ij} \left| f_0 \left( \frac{\partial H'^{DET}_{ij}(\vec{p}, f)}{\partial f} \right)_{f=f_0} \right|^2 \right\},$$

where $f_0$ is a central frequency of an operation frequency band, and $w_{ij}$ are non-negative weights. The inclusion of the weighted sum of frequency dispersion magnitudes may be used to increase instantaneous bandwidth of the solution.

The tuning problem may be solved as an optimization problem with a number of variables equal to a number of degrees of freedom of the tunable medium 200. In some embodiments, an optimization function (e.g., minimizing a norm of a difference between a desired extended channel matrix and an observed extended channel matrix) may be defined as a sum of squares of off-diagonal elements of the determined extended channel matrix. As a specific, non-limiting example where there is a precoder but no decoder, the extended channel matrix may be AH. In this example, the tuning algorithm may become essentially a form of the zero forcing algorithm, except that the precoder is implemented with a scattering/diffractive medium (i.e., the tunable medium 200) applied inside of the propagation channel as opposed to a circuit-based precoder applied to the signals before they enter the near-end EM radiating elements 102. This is essentially a generalization of a multiple-null steering approach to interference cancellation. For example, the $i^{th}$ near-end EM radiating element 102 may be surrounded by a null-forming adaptive layer of the tunable medium 200 that creates nulls at the location of each of the far-end EM radiating elements 104 except the $i^{th}$ far-end EM radiating element 104 that is intended to receive the signal from the $i^{th}$ near-end EM radiating element 102.

It should be noted that although the tunable medium 200 is discussed herein as implementing a coder, the tunable medium 200 may be equivalently thought of as a coded aperture, and the near-end EM radiating elements may be equivalently regarded as corresponding wireless feeds for the coded aperture. Accordingly, the disclosure contemplates that any of the embodiments discussed herein may be equivalently regarded in terms of the tunable medium 200 functioning as a coder and a coded aperture.

Figure 4:
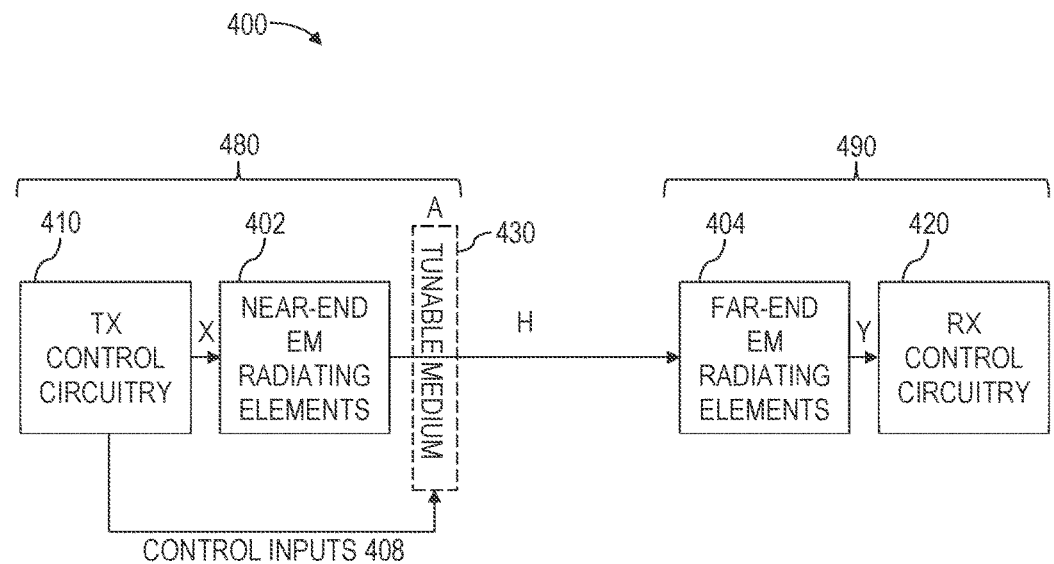
FIG. 4 is a simplified block diagram of an example of a system.

FIG. 4 is a simplified block diagram of an example of a system 400 including near-end equipment 480 and far-end equipment 490. In this example, the near-end equipment 480 includes transmit control circuitry 410 operably coupled to near-end radiating elements 402, and a tunable medium 430. The transmit control circuitry 410 may be similar to the control circuitry 110 of FIG. 1, including at least signal generation circuitry configured to generate transmit signals X and a controller configured to tune the tunable medium 430 (e.g., using control inputs 408). The far-end equipment 490 includes far-end EM radiating elements 404 operably coupled to receive control circuitry 420, including at least signal processing circuitry similar to the signal processing circuitry 116 of FIG. 1.

In some embodiments, the control circuitry 410 may be programmed to tune the tunable medium 430 such that the product of a precoder matrix A of the tunable medium 430 and the channel matrix H is at least approximately equal to a diagonal matrix (e.g., by solving the inverse scattering problem using any of the approaches discussed above). The resulting receive signals Y would be given by XAH+W, which is approximately equal to a diagonal matrix, assuming that W is relatively small. In other words, the control circuitry 410 may be programmed such that the product of the precoder matrix A and the channel matrix H produces a matrix having off-diagonal elements, each of the off-diagonal elements having a magnitude less than or equal to a predetermined threshold value. In such embodiments, each element of the transmit signals X will be communicated to only one of the far-end radiating elements 404. Stated another way, the tunable medium 430 may act as a lens altering radiation patterns of the near-end radiating elements 402 to include peaks to one of the far-end radiating elements 404, and nulls to the others of the far-end radiating elements 404. As a result, the tunable medium 430 may function as a spatial multiplexing precoder.

As a specific, non-limiting example of how this spatial multiplexing precoder may be implemented, the control circuitry 410 may be programmed such that the precoder matrix A of the tunable medium 430 is at least approximately equal to a left pseudo-inverse of the channel matrix H (e.g., by solving the inverse scattering problem using any of the approaches discussed above). In such embodiments, the matrix product of the precoder matrix A and the channel matrix H is approximately equal to an identity matrix (i.e., the numbers in the main diagonal are ones, and the off-diagonal elements are zeros). A similar result may be obtained if the control circuitry 410 is programmed to tune the tunable medium 430 such that the precoder matrix A is the matrix inverse of the channel matrix H (assuming that H is square and non-singular).

Figure 5:
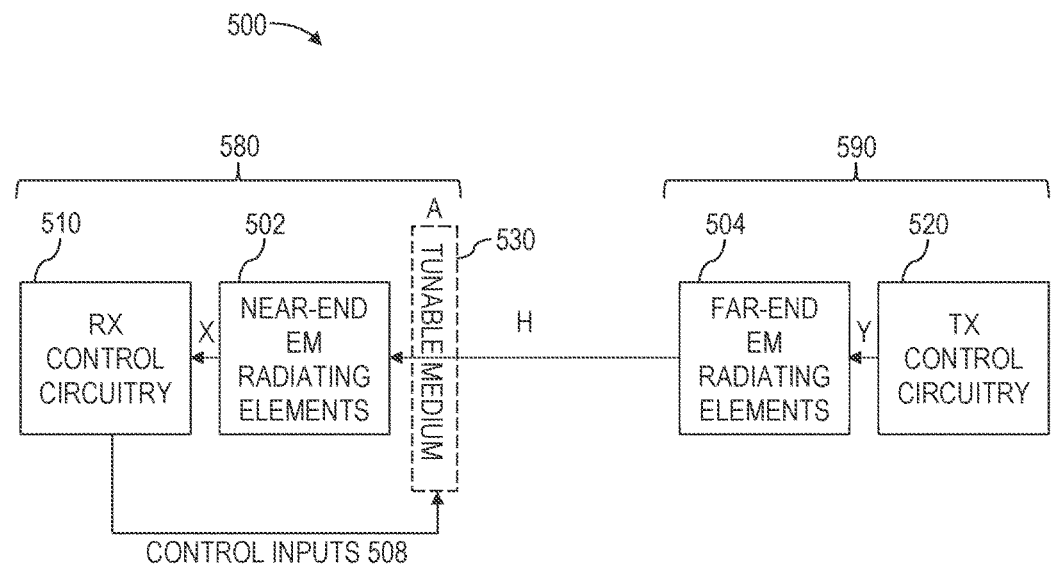
FIG. 5 is a simplified block diagram of another example of a system.

FIG. 5 is a simplified block diagram of another example of a system 500 including near-end equipment 580 and far-end equipment 590. The system 500 of FIG. 5 is similar to the system 400 of except that the near-end equipment 580 is configured to receive communications from the far-end circuitry 590 (i.e., the near-end equipment is functioning as a receiver and the far-end equipment is functioning as a transmitter). The near-end equipment 580 includes receive control circuitry 510 operably coupled to near-end EM radiating elements 502 and a tunable medium 530. The receive control circuitry 510 includes at least signal processing circuitry operably configured to receive signals X from the near-end EM radiating elements 520, and a controller configured to tune the tunable medium 530 (e.g., using control inputs 508). The far-end equipment 590 may include far-end EM radiating elements 504 operably coupled to transmit control circuitry 520 including at least signal generation circuitry.

While the near-end EM radiating elements 502 are receiving, the channel matrix H may include an M by N complex matrix, and each element $h_{ba}$ may include a fading coefficient of a channel from a $b^{th}$ far-end EM radiating element 504 to an $a^{th}$ near-end EM radiating element 502. In other words, a matrix product of a vector of far-end transmit signals Y transmitted by the far-end EM radiating elements 504 and the channel matrix H plus any noise W produces a vector of near-end receive signals X received by the near-end EM radiating elements 502, or equivalently X=YH+W.

The tunable medium 530 provides the ability to decode the receive signals X. Specifically, the tunable medium 530 may be tuned to modify the receive signals X received at the near-end EM radiating elements 502. For example, the receive signals X may be expressed as a the product of transmit signals Y and the channel matrix H multiplied by a decoder matrix A of the tunable medium 530, plus any noise W, or X=YHA+W. Accordingly, the extended channel matrix H' may be expressed as HA in such instances.

In some embodiments, the control circuitry 510 may be programmed to tune the tunable medium 530 such that the product of the channel matrix H and the decoder matrix A of the tunable medium 530 is at least approximately equal to a diagonal matrix (e.g., by solving the inverse scattering problem using any of the approaches discussed above). The resulting receive signals X would be given by YHA+W, which is approximately equal to a diagonal matrix, assuming that W is relatively small. In other words, the control circuitry 510 may be programmed such that the product of the channel matrix H and the precoder matrix A produces a matrix having off-diagonal elements, each of the off-diagonal elements having a magnitude that is less than or equal to a predetermined threshold value. In such embodiments, each element of the transmit signals Y will be communicated to only one of the near-end radiating elements 502. Stated another way, the tunable medium 530 may act as a lens altering receive radiation patterns of the near-end radiating elements 502 to include peaks to one of the far-end radiating elements 504, and nulls to the others of the far-end radiating elements 504. As a result, the tunable medium 530 may function as a spatial multiplexing decoder.

As a specific, non-limiting example of how this spatial multiplexing decoder may be implemented, the control circuitry 510 may be programmed such that the decoder matrix A of the tunable medium 530 is at least approximately equal to a right pseudo-inverse of the channel matrix H (e.g., by solving the inverse scattering problem using any of the approaches discussed above). In such embodiments, the matrix product of the channel matrix H and the decoder matrix A is approximately equal to an identity matrix (i.e., the numbers in the main diagonal are ones, and the off-diagonal elements are zeros). A similar result may be obtained if the control circuitry 530 is programmed to tune the tunable medium 530 such that the decoder matrix A is the matrix inverse of the channel matrix H (assuming that H is square and non-singular).

Figure 6:
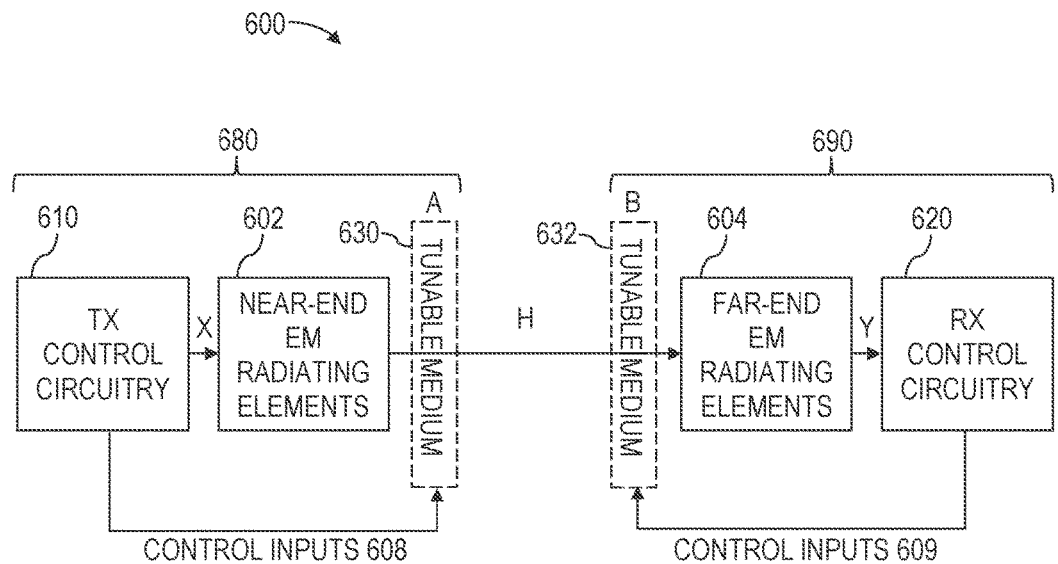
FIG. 6 is a simplified block diagram of another example of a system.

In some embodiments, tunable media such as the tunable medium 200 discussed with reference to FIG. 1 may be included in both near-end equipment and far-end equipment. FIG. 6 illustrates an example of such a system.

FIG. 6 is a simplified block diagram of another example of a system 600 including near-end equipment 680 and far-end equipment 690. The near-end equipment 680 includes transmit control circuitry 610 operably coupled to near-end EM radiating elements 602 and a tunable medium 630. The transmit control circuitry 610 is programmed to provide transmit signals X to the near-end EM radiating elements 602, and tune the tunable medium 630 (e.g., using control inputs 608). The transmit control circuitry 610, the near-end EM radiating elements 602, and the tunable medium 630 may be similar to the control circuitry 110, the near-end EM radiating elements 102, and the tunable medium 200, respectively, as discussed above with reference to FIG. 1.

The far-end equipment 690 includes receive control circuitry 620 operably coupled to far-end EM radiating elements 604 and a tunable medium 632. The far-end EM radiating elements 604 are configured to deliver receive signals Y resulting from transmit signals X at the near-end EM radiating elements 602 to the receive control circuitry 620. The receive control circuitry 620 is configured to receive the receive signals X, and tune the tunable medium 632 (e.g., using control inputs 609). The receive control circuitry 620, the far-end EM radiating elements 604, and the tunable medium 632 may be similar to the control circuitry 110, the near-end EM radiating elements 104, and the tunable medium 200, respectively, as discussed above with reference to FIG. 1.

The receive signal Y received by the receive control circuitry 620 may be expressed as Y=XAHB+W, where X is the transmit signal, A is a precoder matrix of the tunable medium 630, H is the channel matrix, B is a decoder matrix of the tunable medium 632, and W is any noise. Coding (e.g., precoding, decoding) may be performed at the near-end equipment 680, the far-end equipment 690, or a combination thereof. Accordingly, the extended channel matrix H' may be expressed as AHB in such instances.

In some embodiments, the transmit control circuitry 610 and the receive control circuitry 620 may be programmed to tune the tunable media 630, 632, respectively, such that the matrix product AHB is at least approximately equal to a diagonal matrix (e.g., by solving the inverse scattering problem using any of the approaches discussed above). The resulting receive signals Y would be given by XAHB+W, which is approximately equal to a diagonal matrix, assuming that W is relatively small. In other words, the off-diagonal elements of the matrix product AHB produces a matrix having off-diagonal elements, each of the off-diagonal elements having a magnitude that is less than or equal to a predetermined threshold value. In such embodiments, each element of the transmit signals X will be communicated to only one of the far-end radiating elements 604. Stated another way, the tunable media 630, 632 may act as lenses altering radiation patterns of the near-end radiating elements 602 and the far-end radiating elements 604 to include peaks and nulls configured to implement spatial multiplexing coders. As a result, the tunable media 630, 632 may function as spatial multiplexing coders.

As a specific, non-limiting example of how this spatial multiplexing coding may be implemented, the transmit control circuitry 610 may be programmed such that a precoder matrix of the tunable medium 630 is at least approximately equal to $U^\dagger$, where $U\Sigma V^\dagger$ is a singular value decomposition of the channel matrix H, and $U^\dagger$ is the conjugate transpose of unitary matrix U (e.g., by solving the inverse scattering problem using any of the approaches discussed above). Also, the receive control circuitry 620 may be programmed such that the decoder matrix B of the tunable medium 632 is at least approximately equal to V, where V is the conjugate transpose of $V^\dagger$. In such embodiments, the matrix product of the precoder matrix A, the channel matrix H, and the decoder matrix B is approximately equal to a diagonal matrix (i.e., the numbers in the main diagonal are the singular values of the channel matrix H, and the off-diagonal elements are zeros) (e.g., by solving the inverse scattering problem using any of the approaches discussed above). A similar result (except that the diagonal elements of AHB are the eigenvalues of the channel matrix H instead of the singular values) may be obtained if the transmit control circuitry 610 tunes the tunable medium 630 such that the precoder matrix A is approximately equal to $Q^{-1}$, and the receive control circuitry 620 tunes the tunable medium 632 such that the decoder matrix B is approximately equal to Q, where $Q\Lambda Q^{-1}$ is the eigenvalue decomposition of the channel matrix H (assuming that H is a diagonizable matrix), and $Q^{-1}$ is the matrix inverse of the matrix Q.

Of course, the designation of the near-end equipment 680 and the far-end equipment 690 as near-end and far-end, respectively, is merely relative. From the perspective of the far-end equipment 690, the near-end equipment 680 would be far-end equipment, and the far-end equipment 680 would be near-end equipment.

In some embodiments where data streams are transmitted from the near-end equipment 680 to the far-end equipment 690, there may be a number D of data streams, $N_t$ near-end EM radiating elements 602 ($N_t \geq D$), and $N_r$ far-end EM radiating elements 604. As previously discussed, the $N_r$ far-end EM radiating elements 604 may be collocated within a single device, or distributed arbitrarily between any number $N_u$ of users (e.g., separate physical devices), where $1 \leq N_u \leq N_r$. In such embodiments, the a precoder matrix A of the tunable medium 630 is of size D-by-$N_t$, the channel matrix H is $N_r$-by-$N_t$, and the decoder matrix B is $N_r$-by-D. In such instances, the full demultiplexed matrix AHB is a square, Hermitian matrix of size D-by-D. This matrix is automatically symmetric because the combination of the original propagation channel H and the two coding tunable media 630, 632 may itself be viewed as a propagation channel AHB. Assuming that this channel is reciprocal leads to the conclusion that the combined channel matrix AHB is Hermitian.

In embodiments disclosed herein, the tunable medium 630 functioning as a precoder may be placed between the $N_t$ near-end EM radiating elements 602 and the propagation channel, and the tunable medium 632 functioning as a decoder may be placed between the $N_r$ far-end EM radiating elements 604 and the propagation channel. In some such embodiments, the number of data steams D may match the number of far-end EM radiating elements 604 receiving the data streams. Moreover, in some embodiments, $N_t=N_r=D$. In some embodiments, the number of near-end EM radiating elements 602 may vary dynamically (e.g., as the number $N_r$ receiving far-end EM radiating elements 604 dynamically changes).

Figure 7:
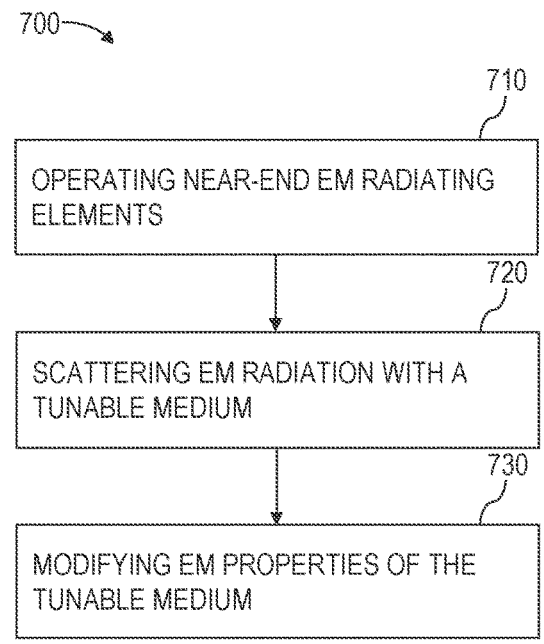
FIG. 7 is a simplified flow chart illustrating a method of operating an antenna system.

FIG. 7 is a simplified flow chart illustrating a method 700 of operating an antenna system, such as the antenna system 100 illustrated in FIG. 1. Referring to FIGS. 1 and 7 together, the method 700 includes operating 710 near-end EM radiating elements 102. In some embodiments, operating 710 near-end EM radiating elements 102 includes delivering EM signals including a plurality of different data streams to the near-end EM radiating elements 102 for transmission to the far-end EM radiating elements 104 (e.g., using the same or similar carrier frequency for each of the plurality of different data streams). In some embodiments, operating 710 near-end EM radiating elements 102 includes receiving EM signals including a plurality of different data streams from the far-end EM radiating elements 104 through the near-end EM radiating elements 102.

The method 700 also includes scattering 720 EM radiation 106 transmitted between the near-end EM radiating elements 102 and the far-end EM radiating elements 104 with a tunable medium 200.

The method 700 further includes modifying 730 EM properties of the tunable medium 200 to modify the EM radiation 106 transmitted between the near-end EM radiating elements 102 and the far end EM radiating elements 104. In some embodiments, modifying 730 EM properties of the tunable medium 200 includes dynamically modifying the EM properties of the tunable medium 200 during operation of the antenna system 100. In some embodiments, modifying 730 EM properties of the tunable medium 200 includes pre-selecting a state of the tunable medium 200 and holding the tunable medium 200 in the selected state during operation of the antenna system 100.

Figure 8:
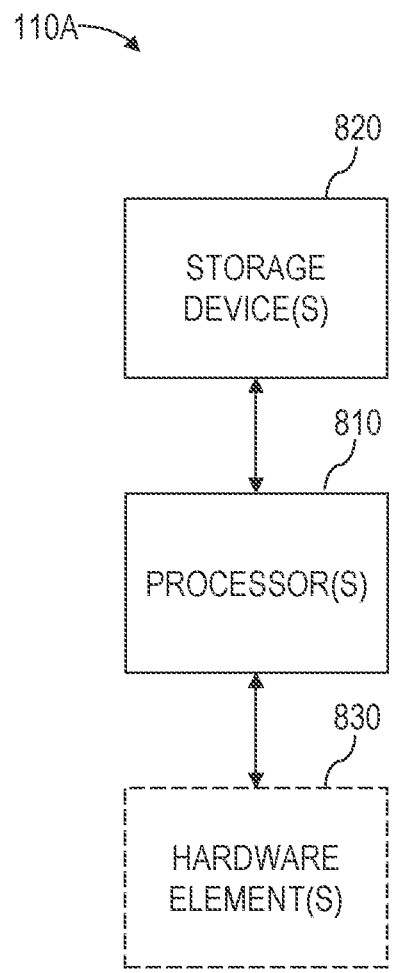
FIG. 8 is a simplified block diagram of example control circuitry of the antenna system of FIG. 1.

FIG. 8 is a simplified block diagram of example control circuitry 110A (hereinafter "control circuitry" 110A) of control circuitry 110 of the antenna system 100 of FIG. 1. The control circuitry 110A may include at least one processor 810 (hereinafter referred to simply as "processor" 810) operably coupled to at least one data storage device 820 (hereinafter referred to simply as "storage" 820). The storage 820 may include at least one non-transitory computer-readable medium. By way of non-limiting example, the storage 820 may include one or more volatile data storage devices (e.g., Random Access Memory (RAM)), one or more non-volatile data storage devices (e.g., Flash, Electrically Programmable Read Only Memory (EPROM), a hard drive, a solid state drive, magnetic discs, optical discs, etc.), other data storage devices, and combinations thereof.

The storage 820 may also include data corresponding to computer-readable instructions stored thereon. The computer-readable instructions may be configured to instruct the processor 810 to execute at least a portion of the functions that the control circuitry 110 (FIG. 1) is configured to perform. By way of non-limiting example, the computer-readable instructions may be configured to instruct the processor 810 to execute at least a portion of the functions of at least one of the signal generation circuitry 114, the signal processing circuitry 116, and the controller 112 (e.g., at least a portion of the functions discussed with reference to the method 700 of FIG. 7) of FIG. 1. Also by way of non-limiting example, the computer-readable instructions may be configured to instruct the processor 810 to execute at least a portion of the functions of at least one of the transmit control circuitry 410 (FIG. 4), the receive control circuitry 420 (FIG. 4), the receive control circuitry 510 (FIG. 5), the transmit control circuitry 520 (FIG. 5), the transmit control circuitry 610 (FIG. 6), and the receive control circuitry 620 (FIG. 6).

The processor 810 may include a Central Processing Unit (CPU), a microcontroller, a Programmable Logic Controller (PLC), other programmable device, or combinations thereof. The processor 810 may be configured to execute the computer-readable instructions stored by the storage 820. By way of non-limiting example, the processor 810 may be configured to transfer the computer-readable instructions from non-volatile storage of the storage 820 to volatile storage of the storage 820 for execution. Also, in some embodiments, the processor 810 and at least a portion of the storage 820 may be integrated together into a single package (e.g., a microcontroller including internal storage, etc.). In some embodiments, the processor 810 and the storage 820 may be implemented in separate packages.

In some embodiments, the control circuitry 110A may also include at least one hardware element 830 (hereinafter referred to simply as "hardware element" 830). The hardware element 830 may be configured to perform at least a portion of the functions the control circuitry 110A is configured to perform. By way of non-limiting example, the hardware element 830 may be configured to perform at least a portion of the functions of at least one of the signal generation circuitry 114, the signal processing circuitry 116, and the controller 112 (e.g., at least a portion of the functions discussed with reference to the method 700 of FIG. 7) of FIG. 1. Also by way of non-limiting example, the hardware element 830 may be configured to instruct the processor 810 to execute at least a portion of the functions of at least one of the transmit control circuitry 410 (FIG. 4), the receive control circuitry 420 (FIG. 4), the receive control circuitry 510 (FIG. 5), the transmit control circuitry 520 (FIG. 5), the transmit control circuitry 610 (FIG. 6), and the receive control circuitry 620 (FIG. 6). In some embodiments, the hardware element 830 may include a System on Chip (SOC), an array of logic circuits configured to be programmably interfaced to perform functions of the control circuitry 110A (e.g., a Field Programmable Gate Array (FPGA)), an Application Specific Integrated Circuit (ASIC), other hardware elements, and combinations thereof.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Furthermore, the disclosure contemplates combinations of any of the disclosed embodiments and examples, except as would be incompatible in practice, as would be understood by those skilled in the art.

What is claimed is:

1. An antenna system, comprising:
   a plurality of near-end electromagnetic (EM) radiating elements;
   a tunable medium positioned relative to the plurality of near-end EM radiating elements and a plurality of far-end EM radiating elements to scatter EM radiation transmitted between the plurality of near-end EM radiating elements and the plurality of far-end EM radiating elements; and
   control circuitry comprising a controller operably coupled to the tunable medium and programmed to modify EM properties of the tunable medium to operate as a linear coder between the plurality of near-end EM radiating elements and the plurality of far-end EM radiating elements based on which of the plurality of near-end EM radiating elements and the plurality of far-end EM radiating elements is a source of the EM radiation transmitted between the plurality of near-end EM radiating elements and the plurality of far-end EM radiating elements to modify the EM radiation transmitted between the plurality of near-end EM radiating elements and the plurality of far-end EM radiating elements.

2. The antenna system of claim 1, wherein the control circuitry further comprises signal generation circuitry operably coupled to the plurality of near-end EM radiating elements and configured to deliver EM signals including a plurality of different data streams to the plurality of near-end EM radiating elements for transmission to the plurality of far-end EM radiating elements.

3. The antenna system of claim 2, wherein the tunable medium comprises a tunable metamaterial comprising a plurality of tunable EM scattering elements.

4. The antenna system of claim 3, wherein the plurality of tunable EM scattering elements comprises a plurality of tunable capacitive elements.

5. The antenna system of claim 3, wherein the plurality of tunable EM scattering elements comprises a plurality of variable resistive elements.

6. The antenna system of claim 3, wherein the plurality of tunable EM scattering elements comprises a plurality of variable inductance elements.

7. The antenna system of claim 2, wherein the controller is programmed to dynamically tune the tunable medium to function as a linear beamforming precoder.

8. The antenna system of claim 2, wherein the controller is programmed to dynamically tune the tunable medium to function as a linear spatial-diversity precoder.

9. The antenna system of claim 2, wherein the controller is programmed to dynamically tune the tunable medium to function as a linear spatial multiplexing precoder.

10. The antenna system of claim 9, wherein the controller is programmed to dynamically determine a channel matrix of channels between the plurality of near-end EM radiating elements and the plurality of far-end EM radiating elements, and dynamically tune the tunable medium as a function of the determined channel matrix.

11. The antenna system of claim 10, wherein the controller is programmed to determine values of control parameters of the tunable medium.

12. The antenna system of claim 11, wherein the controller is programmed to determine the values of the control parameters of the tunable medium by solving an inverse scattering problem, wherein the inverse scattering problem is postulated as an equality between a determined extended channel matrix and a desired extended channel matrix.

13. The antenna system of claim 11, wherein the controller is programmed to determine the values of the control parameters of the tunable medium by determining a minimization of a matrix norm of a difference between a determined extended channel matrix and a desired extended channel matrix.

14. The antenna system of claim 11, wherein the controller is programmed to determine the values of the control parameters of the tunable medium by determining a minimization of a sum of squared differences between at least a portion of values from a determined extended channel matrix and corresponding values of a desired extended channel matrix.

15. The antenna system of claim 11, wherein the controller is programmed to determine the values of the control parameters of the tunable medium by determining a minimization of a sum of squared differences between at least a portion of values from a determined extended channel matrix and corresponding values of a desired extended channel matrix, plus a weighted sum of frequency dispersion magnitudes of the portion of values.

16. The antenna system of claim 10, wherein the controller is programmed such that a precoder matrix of the tunable medium is at least approximately equal to $U^\dagger$, where $U\Sigma V^\dagger$ is a singular value decomposition of the determined channel matrix, and $U^\dagger$ is the conjugate transpose of unitary matrix U.

17. The antenna system of claim 10, wherein the controller is programmed such that a precoder matrix of the tunable medium is at least approximately equal to a left pseudo-inverse of the determined channel matrix.

18. The antenna system of claim 10, wherein the controller is programmed such that a precoder matrix of the tunable medium multiplied by the determined channel matrix produces a matrix that is approximately equal to a diagonal matrix.

19. The antenna system of claim 10, wherein the controller is programmed such that a precoder matrix of the tunable medium multiplied by the determined channel matrix produces a matrix having off-diagonal elements, wherein a magnitude of each of the off-diagonal elements is less than or equal to a predetermined threshold value.

20. The antenna system of claim 10, wherein the controller is programmed such that a matrix product between a precoder matrix of the tunable medium and the determined channel matrix multiplied by a decoder matrix of a far-end decoder is approximately equal to a diagonal matrix.

21. A method of operating an antenna system, the method comprising:
   operating a plurality of near-end electromagnetic (EM) radiating elements; scattering EM radiation transmitted between the plurality of near-end EM radiating elements and a plurality of far-end EM radiating elements with a tunable medium; and
   modifying EM properties of the tunable medium to operate as a linear coder between the plurality of near-end EM radiating elements and the plurality of far-end EM radiating elements based on which of the plurality of near-end EM radiating elements and the plurality of far-end EM radiating elements is a source of the EM radiation transmitted between the plurality of near-end EM radiating elements and the plurality of far-end EM radiating elements to modify the EM radiation transmitted between the plurality of near-end EM radiating elements and the plurality of far-end EM radiating elements.

22. The method of claim 21, wherein modifying EM properties of the tunable medium comprises dynamically modifying the EM properties of the tunable medium during operation of the antenna system.

23. The method of claim 21, wherein modifying EM properties of the tunable medium comprises pre-selecting a state of the tunable medium and holding the tunable medium in the selected state during operation of the antenna system.

24. The method of claim 21, further comprising delivering EM signals including a plurality of different data streams to the plurality of near-end EM radiating elements for transmission to the plurality of far-end EM radiating elements.

25. The method of claim 24, wherein delivering EM signals includes delivering the EM signals to the plurality of near-end EM radiating elements for transmission to the plurality of far-end EM radiating elements distributed between at least two physically separate devices.

26. The method of claim 24, wherein delivering EM signals includes delivering EM signals including a number of different data streams that is equal to a number of the plurality of far-end EM radiating elements, each of the plurality of far-end EM radiating elements receiving only one of the plurality of data streams.

27. The method of claim 24, wherein delivering EM signals includes delivering EM signals including a number of different data streams that is less than a number of the plurality of far-end EM radiating elements.

28. The method of claim 24, wherein delivering EM signals includes delivering EM signals including a number of different data streams that is equal to a number of the plurality of near-end EM radiating elements.

29. The method of claim 24, wherein delivering EM signals includes delivering EM signals including a number of different data streams that is less than a number of the plurality of near-end EM radiating elements.

30. The method of claim 24, wherein scattering EM radiation with a tunable medium comprises scattering the EM radiation with a tunable metamaterial comprising a plurality of tunable EM scattering elements.

31. The method of claim 30, wherein scattering the EM radiation with a tunable metamaterial comprising a plurality of tunable EM scattering elements comprises scattering the EM radiation with at least one tunable-impedance two-port lumped circuit element.

32. The method of claim 24, wherein scattering EM radiation with a tunable medium comprises scattering the EM radiation with a tunable medium that is tunable with a number of degrees of freedom that is greater than or equal to a number of independent elements of a channel matrix of channels between the plurality of near-end EM radiating elements and the plurality of far-end EM radiating elements.

33. The method of claim 24, wherein scattering EM radiation transmitted between the plurality of near-end EM radiating elements and a plurality of far-end EM radiating elements comprises scattering the EM radiation at least substantially in a direction of a specular reflection relative to a surface of a body carrying the plurality of near-end EM radiating elements.

34. The method of claim 24, wherein scattering EM radiation transmitted between the plurality of near-end EM radiating elements and a plurality of far-end EM radiating elements comprises scattering the EM radiation at least substantially in a direction towards the plurality of far-end EM radiating elements.

35. The method of claim 24, wherein operating a plurality of near-end EM radiating elements comprises operating the plurality of near-end EM radiating elements with the tunable medium at least partially surrounding at least a portion of the plurality of near-end EM radiating elements.

36. The method of claim 35, wherein operating the plurality of near-end EM radiating elements with the tunable medium at least partially surrounding at least a portion of the plurality of near-end EM radiating elements comprises operating the plurality of near-end radiating elements inside of a tunable radome comprising the tunable medium.

37. The method of claim 24, further comprising dynamically tuning the tunable medium to function as a linear beamforming precoder.

38. The method of claim 24, further comprising dynamically tuning the tunable medium to function as a linear spatial-diversity precoder.

39. The method of claim 24, further comprising dynamically tuning the tunable medium to function as a linear spatial multiplexing precoder.

* * * * *